United States Patent [19]

Klinger

[11] 4,324,608

[45] Apr. 13, 1982

[54] LABELING APPARATUS

[76] Inventor: Max H. Klinger, Obere Ringstrasse 54, D-4901 Hiddenhausen, Fed. Rep. of Germany

[21] Appl. No.: 266,234

[22] Filed: May 22, 1981

[30] Foreign Application Priority Data

May 22, 1980 [DE] Fed. Rep. of Germany ....... 3019506

[51] Int. Cl.³ .............................................. B32B 31/00

[52] U.S. Cl. .................................. 156/351; 156/361; 156/142; 156/184

[58] Field of Search ............................... 156/540–542, 156/361–364, 344, 584, 350, 317

[56] References Cited

U.S. PATENT DOCUMENTS 4,046,613 9/1977 Kucheck ........................ 156/542 X

*Primary Examiner*—David A. Simmons

*Attorney, Agent, or Firm*—Pollock, Vande Sande & Priddy

[57] ABSTRACT

Apparatus for transferring self-adhesive labels from a supply roll to continuously advancing containers or packaging material, including means for simple, on-site adjustment of the label positions with respect to the velocity and/or spacing of the items to be labeled. The labels move on a conveyor belt transversely of the material flow path, while an indicator moves oppositely to and in synchronism with the conveyor belt past one or more sensors controlling the conveyor belt drive. The positions of the sensors are easily adjustable to correspond to the desired labeling positions.

8 Claims, 6 Drawing Figures

LABELING APPARATUS

SUMMARY OF THE INVENTION

The present invention relates to labeling apparatus for transferring self-adhesive labels from a conveyor belt to products (or their containers), the labels being carried along a conveyor belt which extends transversely to the flow path of the products, and at one of whose ends, laterally of the product flow path, there is arranged a pull-off edge for redirecting the conveyor belt and transferring the labels thereto.

BACKGROUND OF THE INVENTION

Labeling apparatus of this type is designed to transfer self-adhesive labels onto a continuously fed series of products or continuosly fed packaging material. The labels are fed on a carrier belt laterally toward the flow path of the products or their packaging, are pulled off the carrier belt via an acute angled pull-off edge, transferred to a conveyor belt extending transversely to the product flow path, removed from the conveyor belt and impressed on the products.

The timing of the delivery of the labels at the pull-off edge and thus of the transfer to the conveyor belt can be predetermined by suitable control of the drive of the label carrier belt. To the extent that, as is frequently the case, several products are simultaneously fed side-by-side on the material flow path, and thus several labels must be transferred at distances one after another upon the conveyor belt, control of the positions and the spacings between the labels on the conveyor belt is effected by means of a program which takes into account the spacing of the products and the speed of the transport belt, and which can control the movement of the carrier belt and thus the delivery of the labels. The production of such a program requires a series of complex calculations and presupposes precise maintenance of all velocities of movement. Corrections of the positions of labels relative to the products or their containers are thus possible during operation at most to the extent that the timing of delivery for all the labels is moved ahead or back, or the distance between all labels is altered to the same degree. Any other changes require the use of totally new programs.

However, in practise it is frequently necessary or at least desirable to fine-tune the positions of the labels for each of the product rows arriving side by side, either because the products may be arriving with different spacings or orientations, or because labeling at different locations on the products may be required, or for other reasons.

OBJECT OF THE INVENTION

It is the object of the invention to provide labeling apparatus of the type described, in such manner that adjustment of the labeling position transversely of the product flow path can be made simply and on the spot as needed.

This object is achieved according to the invention by means of an indicator which is movable transversely across the product flow path oppositely to and in synchronism with the movement of the conveyor belt, and at least one sensor arranged laterally of the path of the indicator and adjustable transversely of the product flow path, for scanning the indicator and emitting a signal controlling the motion of the label carrier belt upon passing of the indicator.

The sensor, or preferably several sensors, are installed at particular points of the desired labeling position, e.g., along the longitudinal axis of the labels. During movement of the conveyor band, the indicator passes the sensors in sequence from the side of the flow path opposite the label entry side, so that the sensors give successive signals for advancing the drive of the label carrier belt, whereby each time a label is transferred to the conveyor belt. After the conveyor band has been supplied with, e.g., three consecutive labels, the labels are impressed on the products. In each case, the labels will be located in the positions of the sensors which can be adjusted to the desired label positions. Since there is no difficulty in synchronizing the movement of the indicator counter to the movement of the conveyor belt, the positions of the labels on the conveyor belt always correspond very precisely to the positions of the sensors. In order to correct these positions, the sensors could, for example, be adjusted on a rail extending transversely across the flow path.

The sensors may be light barriers, or other kinds of scanners known in the art.

The indicator, e.g., an indicator finger controllable by light barriers, may be mounted on a continuous belt or chain, which is operable oppositely to and in synchronism with the conveyor belt.

The conveyor belt may be a perforated belt moving across a suction box. Such conveyors are known per se. They provide the advantage that the labels, after withdrawal from the carrier belt, may be held and suctioned on their non-adhesive side, and then may be impressed directly upon the products with their outer, adhesive side.

BRIEF INTRODUCTION TO THE DRAWINGS

In order that the invention may be more clearly understood, reference will now be made to the accompanying drawings, in which several embodiments of the invention are shown for purposes of illustration, and in which.

DESCRIPTION OF PREFERRED EMBODIMENT

Figure 1:
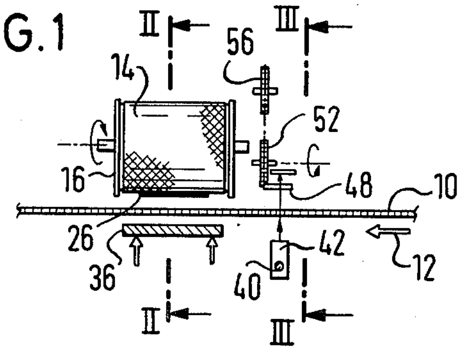
FIG. 1 is a schematic, partial side view of a labeling device according to the invention.
Figure 2:
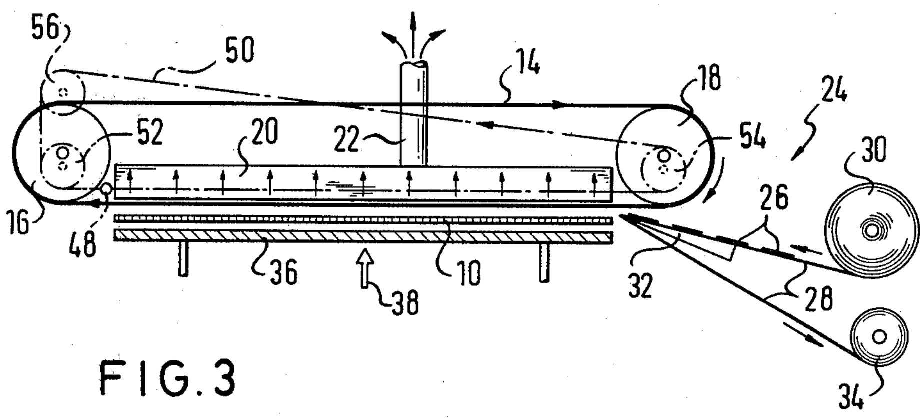
FIG. 2 is a schematic view along line 2—2 of FIG. 1.

FIG. 1 shows a greatly simplified flow path 10 for packing material, which, in the example shown, moves continuously in the direction of arrow 12, and which may, e.g., be welded to packing containers at a succeeding work station (not shown) and then severed. A conveyor belt 14 moves transversely across the width of material flow path 10, belt 14 being of woven or otherwise perforated material which is guided around and driven by guide rollers 16 and 18 (FIG. 2). As illustrated in FIG. 2, in the area of material flow path 10 the conveyor belt 14 moves across a suction box 20 which is at least partly open on the side facing conveyor belt 14, and otherwise is connected by a conduit 22 with a vacuum source (not shown). Such suction conveyors are known per se and hence will not be further described.

As will appear from FIG. 2, a label feed arrangement 24 is located laterally of the material flow path 10. The self-adhesive labels 26 are located on a carrier belt 28 which is drawn about an acute-angled pull-off edge 32 at the lateral border of material flow path 10, and thereupon releases labels to conveyor belt 14 in such manner that the non-adhesive sides rest on the conveyor belt and the labels are held fast by suction box 20. The empty carrier belt 28 is then fed onto carrier belt roll 34, which may contain a controllable drive (not shown) for the carrier belt.

As will be described in more detail hereinbelow, labels 26 are consecutively transferred to conveyor belt 14 with suitable spacing from one another. When the labels have attained the desired lateral spacing transversely to material flow path 10, conveyor belt 14 is stopped, and material flow path 10 is pressed in the direction of arrow 38 against the free, adhesive side of the labels, with the aid of a pressure plate 36, so that the labels adhere directly to the containers or the material in material flow path 10. If desired, the vacuum in suction box 20 can be shut off temporarily at the appropriate times.

Figure 3:
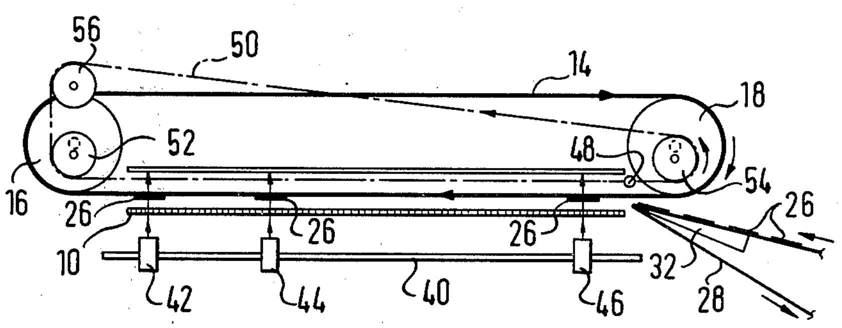
FIG. 3 is a similar view along line 3—3 of FIG. 1.

An important characteristic of the invention relates to the precise and simple adjustment of the position of the labels in the direction transverse to material flow path 10. Particular reference is made in this connection to FIG. 3, together with FIG. 1. In the embodiment illustrated in FIG. 3, a rail 40 extends transversely across material flow path 10, a number of light barriers, 42, 44, 46 in the illustrated example, being arranged on the rail for longitudinal adjustment. The light barriers serve the purpose of scanning an indicator 48, e.g., a finger passing the light barriers during its movement transversely across the material flow path 10 oppositely to and in precisely synchronism with the movement of conveyor belt 14. At the start of the transfer of labels for a row of adjacent products onto the conveyor belt, indicator 48 is located substantially in the position shown in FIG. 2, opposite feed arrangement 24. As the lower stringer of conveyor belt 14 continuously moves from right to left (as shown in FIG. 3), indicator 48 continuously moves from left to right. In doing so, the indicator passes the individual light barriers 42, 44 46, which in each case send an impulse to the drive for feed arrangement 24, whereby carrier belt 28 is so advanced that a label 26 is transferred to conveyor belt 14.

It will be noted that the positions of the labels 26 on the filled up conveyor belt 14 in this manner precisely correspond to the positions of light barriers 42, 44, 46. By suitable coordination of the indicator position with respect to the timing of the transfer of the labels onto conveyor belt 14, the light barriers may be located, for example, along the longitudinal axis of the labels, as shown in FIG. 3. For precise coordination of the light barriers with a desired label position, an adjustment mechanism (not shown) is preferably arranged in the synchronous coupling between conveyor belt 14 and indicator 48.

Indicator 48 may be connected to a linear drive (not shown). However, a particularly simple counter-synchronization can be obtained by attaching indicator 48 to a continuous belt or chain 50 which moves about gears 52, 54, 56 and which is synchronized with the drive of conveyor belt 14, e.g., via a reversing gear.

Figure 4:
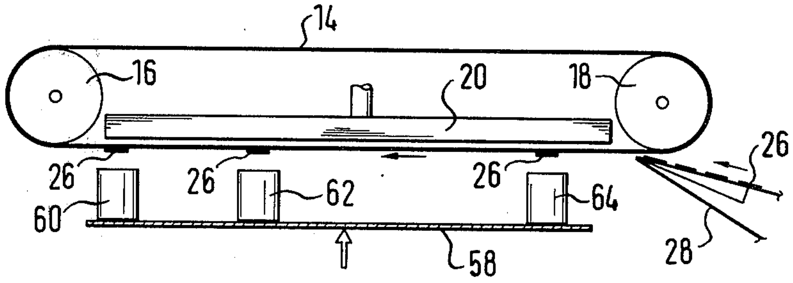
FIG. 4 shows a first embodiment of an installation using the invention.
Figure 5:
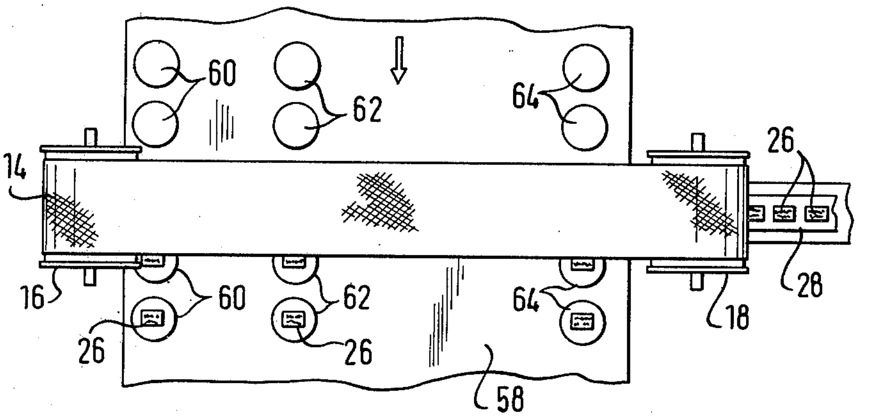
FIG. 5 is a schematic plan view of the installation shown in FIG. 4.

FIGS. 4 and 5 illustrate, in simplified form, an embodiment of the labeling device. Conveyor or belt 14 with labels 26 moves transversely to a conveyor belt 58 on which containers 60, 62, 64 are located. In the illustrated example, the longitudinally advancing rows of containers 60, 62, 64 are differentially spaced. The delivery position of the labels can thus be adapted without difficulty on the spot to the position of the containers beneath the labeling device.

Figure 6:
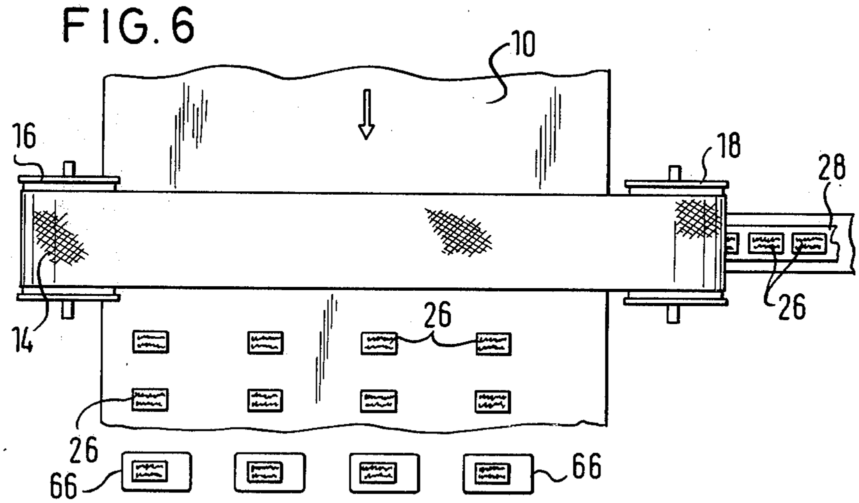
FIG. 6 is a second embodiment of an installation using the invention.

FIG. 6 shows an embodiment which essentially corresponds to a plan view of FIGS. 2 and 3. Labels 26 are impressed in the manner described on continuous material flow path 10. From flow path 10, covers 66 are formed which, for example, may be welded to plastic bowls or the like (not shown).

It will be obvious that, particularly with respect to the indicator and its counter drive, as well as the scanning of the indicator, variations of the described embodiment are possible by use of other drive and scanning mechanisms known in the art.

The present invention has the particular advantage that, by means of the indicator and the sensors, for every row of labels the positions of the individual labels and their spacing can be directly determined by observing the path of the indicator. Since the conveyor belt and the indicator move along the same path, the positions of the sensors which scan the indicator, and the labels on the transport belt which are impressed according to the impulses of the sensors, correspond very precisely. This correspondence is independent of the speed of movement of the products or the packaging material and the velocity of the transport belt. This contrasts with the use of a program storing the time of transfer of the labels as time data, in which the precise maintenance of the speed of the conveyor belt is indispensable.

What is claimed is:

1. Labeling apparatus for the transfer of self-adhesive labels from label carrier means to material to be labeled, comprising (a) conveyor means moving transversely to the path of the material to be labeled;

(b) means adjacent one end of said label carrier means laterally of said path for redirecting said label carrier means and for transferring said labels to said conveyor means;

(c) an indicator movable transversely of said path oppositely to and in synchronism with the movement of said conveyor means;

(d) at least one sensor means for scanning said indicator, said sensor means being arranged laterally of the path of movement of said indicator and being adjustable transversely of said path of the material to be labeled, and producing a signal for controlling the drive of said label carrier means upon passage of said indicator.

2. Labeling apparatus according to claim 1, wherein said indicator is mounted on continuous transport means for movement oppositely to and in synchronism with the movement of said conveyor means.

3. Labeling apparatus according to claim 1, wherein said at least one sensor is a light barrier.

4. Labeling apparatus according to claim 1, wherein at least three said sensor means are arranged on a rail extending transversely to said path of said material to be labeled.

5. Labeling apparatus according to claim 1, wherein said conveyor means comprises a perforated belt arranged for movement across a suction box operably connected to a vacuum source, whereby said labels are caused to contact said conveyor means with their non-adhesive sides.

6. Labeling apparatus according to claim 5, wherein said conveyor belt is made of synthetic woven material.

7. Labeling apparatus according to claim 1, wherein said material to be labeled is pressed against said conveyor means at a labeling station.

8. Labeling apparatus according to claim 7, comprising a pressure plate at said labeling station extending transversely to said path of the material to be labeled, said pressure plate being generally aligned with said suction box on the side thereof opposite to that of said path of the material to be labeled, and being movable in the direction of said suction box.

* * * * *